(12) United States Patent
McGregor et al.

(10) Patent No.: US 6,806,474 B2
(45) Date of Patent: Oct. 19, 2004

(54) METHOD AND SYSTEM FOR DETECTING IONIZING RADIATION

(75) Inventors: Douglas S. McGregor, Riley, KS (US); Kimberlee J. Kearfott, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 196 days.

(21) Appl. No.: 10/214,000

(22) Filed: Aug. 7, 2002

(65) Prior Publication Data

US 2003/0042426 A1 Mar. 6, 2003

Related U.S. Application Data

(63) Continuation-in-part of application No. 09/549,994, filed on Apr. 14, 2000, now Pat. No. 6,528,797.
(60) Provisional application No. 60/310,640, filed on Aug. 7, 2001.

(51) Int. Cl.[7] ................................................. G01T 1/00

(52) U.S. Cl. ..................... 250/393; 250/394; 250/363.1

(58) Field of Search ................................ 250/393, 394, 250/363.04, 363.1, 366, 370.07

(56) References Cited

U.S. PATENT DOCUMENTS

| | | | |
|---|---|---|---|
| 3,612,865 A | | 10/1971 | Walker |
| 3,790,782 A | * | 2/1974 | Inoue et al. ............. 250/361 R |
| 3,979,594 A | | 9/1976 | Anger |
| 4,197,460 A | | 4/1980 | Anger |
| 4,394,576 A | | 7/1983 | Tanaka et al. |
| 5,429,135 A | | 7/1995 | Hawman et al. |
| 5,442,180 A | | 8/1995 | Perkins et al. |
| 5,665,970 A | | 9/1997 | Kronenberg et al. |
| 5,773,829 A | | 6/1998 | Iwanczyk et al. |
| 5,870,191 A | | 2/1999 | Shirley et al. |
| 6,175,120 B1 | | 1/2001 | McGregor et al. |

* cited by examiner

Primary Examiner—Constantine Hannaher
Assistant Examiner—Otilia Gabor
(74) Attorney, Agent, or Firm—Brooks Kushman P.C.

(57) ABSTRACT

A method and system for detecting ionizing radiation emitted by material located over an extended area are provided. The method and system include a radiation detector disposed within a detector space on a detection axis. An array of collimating louvers is positioned about the radiation detector and is movable between different polar positions or angles relative to the detection axis. A mechanism is provided for moving the array of collimating louvers between the different polar angles to collimate the ionizing radiation from different locations over the area. The detector produces electrical signals as a function of the polar positions of the array of collimating louvers.

18 Claims, 5 Drawing Sheets

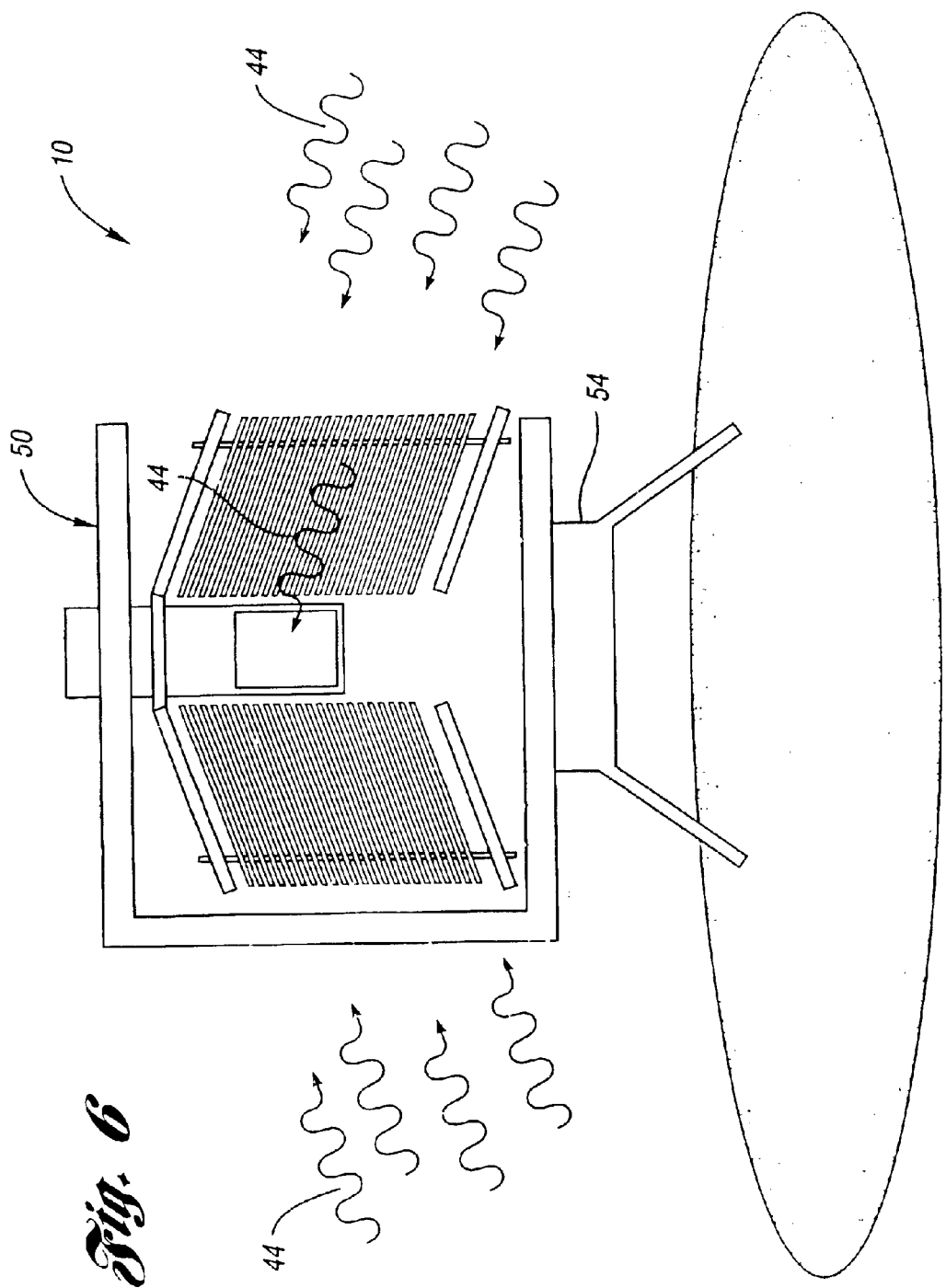

METHOD AND SYSTEM FOR DETECTING IONIZING RADIATION

CROSS-REFERENCE TO RELATED APPLICATIONS

This application claims the benefit of U.S. provisional patent application entitled "Louvered Area Detector for Radiation Survey and Detection Purposes" filed Aug. 7, 2001 and having U.S. Ser. No. 60/310,640. This application is also a continuation-in-part application of U.S. Ser. No. 09/549,994, filed Apr. 14, 2000 now U.S. Pat. No. 6,528,797 and entitled "Method and System for Determining Depth Distribution of Radiation-Emitting Material Located in a Source Medium and Radiation Detector System for Use Therein."

BACKGROUND OF THE INVENTION

1. Field of the Invention

This invention relates to methods and systems for detecting ionizing radiation.

2. Background Art

In principle, in situ gamma-ray spectrometry determines the quantities of radionuclides in some source medium with a portable detector. In comparison, the more established method of laboratory gamma-ray spectroscopy consists of taking small samples of the medium into the laboratory for gamma-ray analysis. In situ gamma-ray spectrometry characterizes a larger volume of material, requires less time to determine accurate radionuclide concentrations, and minimizes worker doses and the risk of radioactive contamination. The main limitation of in situ gamma-ray spectrometry lies in determining the depth distribution of radionuclides.

In general, radionuclide depth distributions aid conventional in situ gamma-ray spectrometry in determining accurate radionuclide inventories and surface dose rates from individual radionuclides. Depth distributions also represent reliable data for radionuclide transport studies. Indications of neutron or energetic charged particle fluxes can result from determinations of the activation as a function of material depth. For decontamination and decommissioning activities, the radionuclide depth distribution determines the amount of material that must be remediated to satisfy the release limits.

To date, three in situ gamma-ray spectroscopic methods have been used to determine the depth distribution of radionuclides in soil and are presented hereinbelow. These three in situ methods are based on multiple photopeak responses, the photopeak-to-valley ratio, and the attenuation of a lead plate. Each method requires a priori assumptions of the depth distribution function and uses a gamma-ray spectrometer. Spectrometers allow the users to decipher the energies of gamma-ray emissions, a necessity for determining the specific radioisotope present. In addition to usually assuming a uniform soil density with depth, all three approaches for determining depth distributions also assume a spatially uniform radionuclide distribution. All three in situ methods require a priori assumptions of the functional form for the depth distribution. The multiple photopeak and peak-to-valley methods only have the ability of determining a single depth parameter. An exception exists if the radionuclide of interest emits three or more significant gamma-rays, decently separated in energy, and if the spectrometer used has sufficient energy resolution to identify and separate each gamma-ray emission. In such cases, the multiple photopeak method could determine one fewer number of depth parameters than the number of significant gamma-rays emissions. The subsurface maxima exhibited by aged $^{137}$Cs fallout in soil are best described by at least two depth parameters and can not be adequately characterized by a single depth parameter.

In addition to the three in situ methods for determining depth distributions, spectroscopic measurements in boreholes have also been studied for applications in oil wells. Because boring itself qualifies as an invasive process, borehole measurements should be considered a quasi-in-situ approach. In addition to increased contamination risks, borehole measurements require boring equipment and custom fabricated detection equipment (extended cryostat lengths for HPGe detectors).

Three other imaging techniques include: pinhole collimation, coded aperture imaging, and Compton scatter imaging. The main limitation, common to all three of these imaging techniques, is the energy resolution of the detectors used. These other imaging techniques utilize position-sensitive detector arrays, which typically are large scintillation crystals with insufficient energy resolution for complex gamma-ray fields. For characterizing low levels of radioactivity, advancements in position-sensitive semiconductor detectors have not yet yielded devices that are large enough for adequate sensitivities or affordable enough for a rugged and portable in situ system.

U.S. Pat. No. 4,197,460 to Anger discloses a collimator assembly used to perform multi-angle nuclear imaging and the results are used to estimate relative depth of objects. Multi-angle display circuits divide the probe radiation image into different regions.

U.S. Pat. No. 3,979,594 to Anger discloses how relative positions of radiation sources at different depths are estimated via a focused collimator. Multiple-channel collimators are mentioned as an option to be used.

U.S. Pat. No. 5,429,135 to Hawman et al. discloses how a focusing collimator detects the depth of an organ in nuclear medicine.

U.S. Pat. No. 5,442,180 to Perkins et al. discloses an apparatus for determining the concentration of radioactive constituents in test samples (such as surface soil) by means of a real-time direct readout.

U.S. Pat. No. 3,612,865 to Walker discloses: (1) a collimator consisting of many small channels that must be fixed at the same polar angle; (2) a position-sensitive radiation detector; and (3) rotation of the collimator to produce circular images that are later processed.

U.S. Pat. No. 5,665,970 to Kronenberg et al. discusses collimation as a common alternative for modifying the "directional capability" of detectors. First and second regions surrounding a detector lead to a difference in forward and backward directed electrons generated by radiation interacting in these regions.

U.S. Pat. No. 6,175,120 to McGregor et al. discloses a high-resolution, solid state, ionization detector and an array of such detectors.

Other U.S. patents of a more general interest include: U.S. Pat. Nos. 4,394,576; 5,773,829; and 5,870,191.

The primary measurement problem which is not solved by the prior art is the in situ determination of the depth distribution of gamma-ray emitting radionuclides in source media. Contaminated soil and activated concrete are common examples of anthropogenic radionuclides in large area geometries. For these measurement situations, the gamma-ray spectrum tends to be complex due to the presence of multiple-radionuclides (natural or anthropogenic in origin). Therefore, the spectrometers used in the field must possess excellent energy resolution to minimize the deleterious effects of interfering gamma-ray emissions.

Other practical issues are that an in situ detection system should be portable and rugged. Because it is not uncommon for low levels of anthropogenic radionuclides to be present in smaller quantities than natural radionuclides, it is important that the detection system also possess a sufficient gamma-ray detection efficiency for reasonable counting times.

SUMMARY OF THE INVENTION

An object of the present invention is to provide an improved method and system for detecting ionizing radiation such as for radiation survey and detection purposes.

In carrying out the above object and other objects of the present invention, a method for detecting ionizing radiation emitted by a material located over an extended area is provided wherein there is no need to move a radiation detector having a detection axis substantially perpendicular to the area and located within a detector space. The method includes allowing ionizing radiation over a first narrow range of polar angles relative to the detection axis to enter the detector space and be detected by the detector while shielding ionizing radiation outside the first narrow range of polar angles from entering the detector space. The method also includes allowing ionizing radiation over at least one other narrow range of polar angles different from the first narrow range of polar angles to enter the detector space and be detected by the detector while shielding ionizing radiation outside the at least one other narrow range of polar angles from entering the detector space until the ionizing radiation emitted by the material over the extended area has been detected.

The method may further include shielding ionizing radiation outside a first range of acute angles substantially perpendicular to the detector axis during the steps of allowing. The method may also include shielding ionizing radiation outside at least one other range of acute angles different from the first range of acute angles during the steps of allowing.

Each of the steps of allowing may allow spaced, parallel planes of ionizing radiation to enter the detector space and be detected by the detector.

The ionizing radiation may be gamma rays.

The detector may be a radiation spectrometer.

The detector may include a semiconductor substrate.

Further, in carrying out the above object and other objects of the present invention a system for detecting ionizing radiation emitted by material located over an extended area is provided. The system includes a support structure having a detector space; a detector having a detection axis substantially perpendicular to the extended area and disposed within the detector space; and an assembly located about the detector. The assembly includes an array of spaced, parallel, collimating louvers movable together between different polar angles relative to the detection axis to allow ionizing radiation over narrow ranges of polar angles relative to the detection axis to enter the detector space and to be detected by the detector while shielding ionizing radiation outside the narrow ranges of polar angles from entering the detector space until ionizing radiation emitted by the material over the extended area has been detected.

The assembly may include a movable mechanism for moving the louvers in unison at first ends of the louvers. Second ends of the louvers may be pivotably connected to the support structure.

The system may further include a partial shield positioned about the detector for movement about the detection axis for shielding ionizing radiation outside selected ranges of acute angles substantially perpendicular to the detection axis. The partial shield is also positioned about the assembly.

The mechanism may be movable in a direction substantially parallel to the detection axis to move the louvers between the different polar angles.

The array of collimating louvers may be cylindrically symmetrical.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 6 is a simplified environmental view of the system of FIG. 3 including a support to make the system free-standing for ground survey or environmental work.

DETAILED DESCRIPTION OF THE PREFERRED EMBODIMENTS

Figure 1:
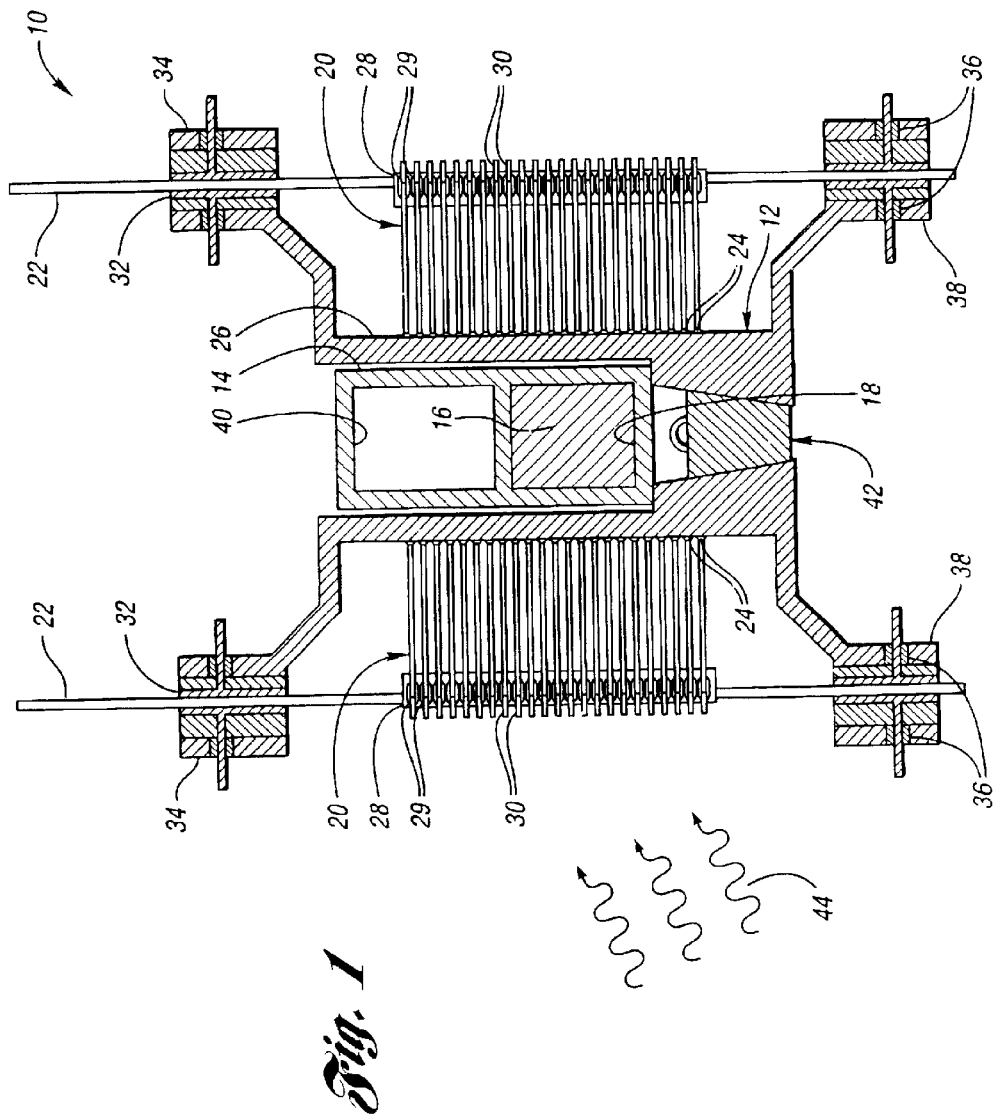
FIG. 1 is a side schematic view, partially broken away and in cross section, of a radiation detector of the present invention, wherein gamma rays or other ionizing radiation is blocked.

Referring now to the drawing Figures, there is generally illustrated a method and system for detecting gamma ray emitting radiation contamination over a surface area and that is capable of determining the type of contamination, the location of the contamination, and the depth. The system or device can be manufactured in a variety of configurations, yet one of the main features is a louvered collimator that has adjustable directionality. The device can be operated by hand or remotely. The device can be deployed by an individual or may be deployed remotely, such as with a robot carrier. The device may incorporate any number of different gamma ray spectrometers, which may include NaI(Tl) detectors, high-purity Ge semiconductor detectors, CdZnTe semiconductor detectors, or any combination of the aforementioned detectors.

Referring specifically to FIG. 1, the basic device or system, generally indicated at 10, includes a support structure, generally indicated at 12, which supports a housing or container 14 in which a gamma ray detector 16, preferably a spectrometer, is inserted in a first compartment 18 of the container 14. The support structure 12 also hingedly supports an array of flat louvered collimator plates or louvers 20. The plates 20 are spaced such that they form an array of louvers 20, which are attached to each other by movable vertical stems 22. The louvers 20 are also attached with hinge mechanisms 24 to a body portion 26 of the support structure 12 and are also attached to a central stem system or column 28 such that they may swivel with their bases at the central stems or columns 28. The stems 28 are attached with the hinge mechanism 24 to the louvers 20 such that they are free to move together in an up and down motion.

Eye loop slots 29 in the stems 28 allow for holding pins 30 to move back and forth freely as the louvers 20 are raised and lowered. Slidable linear bearings 32 fitted into arm portions 34 of the support structure 12 and linear bearings 36 fitted into leg portions 38 of the support structure 12 allow for the main stem portion 28 to be freely raised and lowered as the louvers 20 are raised and lowered. The movable bearings and the eye loop slots 29 provide a means to address the change in the horizontal position of the holding pins 30 that attach the louvers 20 to the movable stems 28.

The container 14 also typically includes a second compartment 40 for housing electronics such as a PM tube or preamplifier.

Also, the body portion 26 of the support structure 12 typically includes an aperture 42 in which a removable lead or Tungston plug 42 is inserted.

Figure 2:
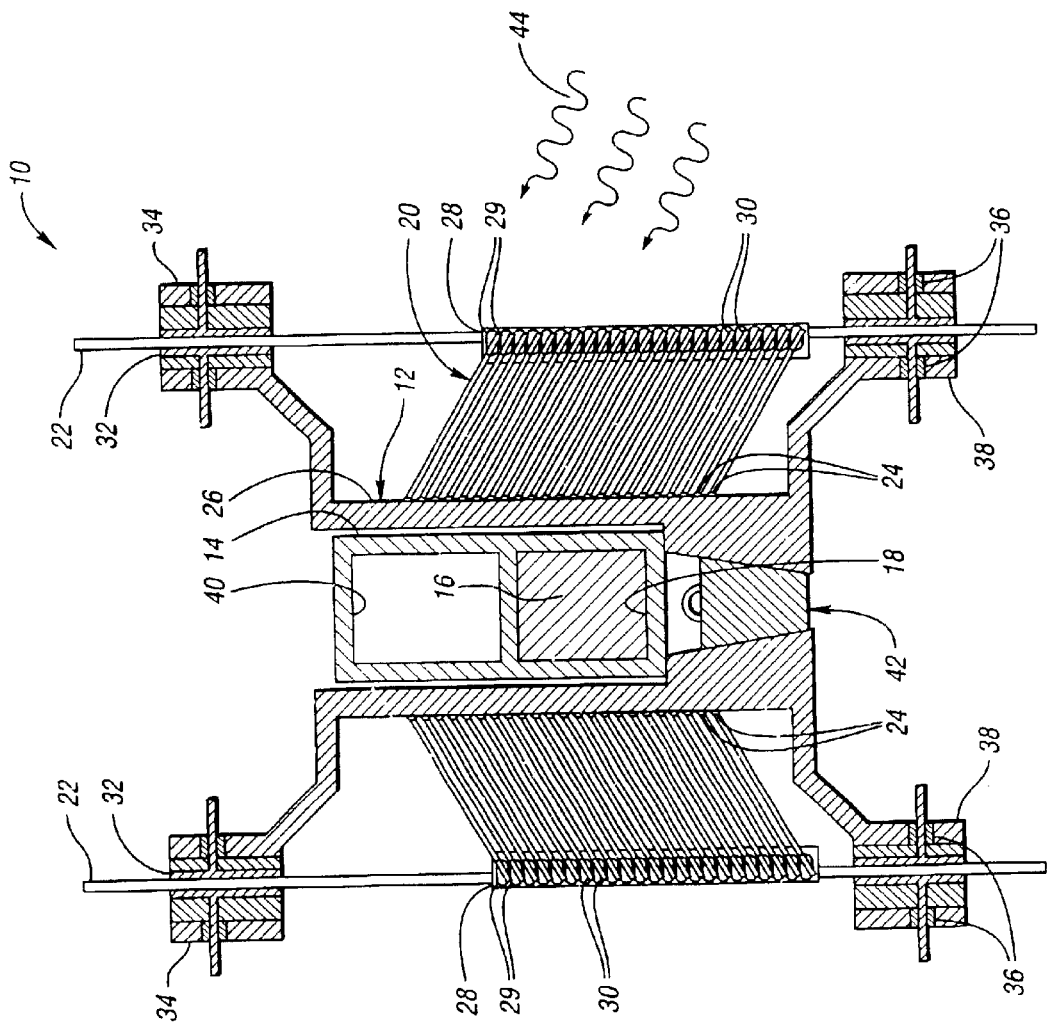
FIG. 2 is a view similar to the view of FIG. 1 with louvers of the system moved to allow gamma rays to pass therethrough wherein the angle of the louvers give the emission location angle.

FIG. 2 shows the system 10 with the stems 22 moved to a downward position wherein gamma ray 44 are collimated by the louvers 20 which have hingedly moved to point downward from the substantially horizontal position of FIG. 1.

The louver area design can be any geometrical shape. For example squares, rectangles, trapezoids, or semi-circles, can be used for the louver area shape. Louvers 20 that are moved up and down should be able to contract and stretch as they rotate above and below an angle parallel to the ground surface plane.

Figure 4:
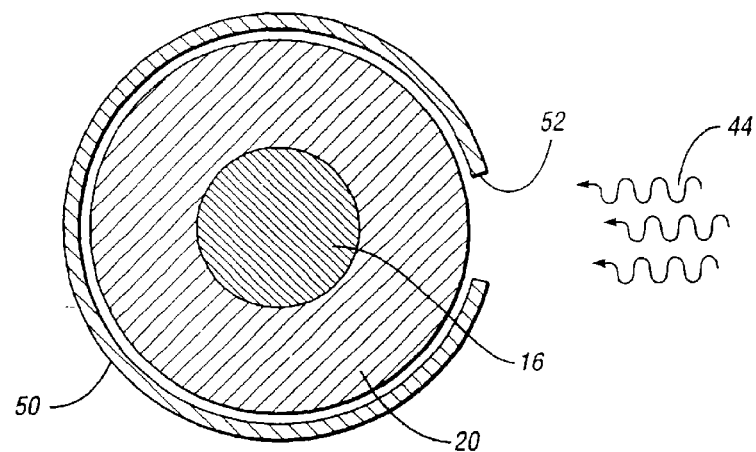
FIG. 4 is a top view, partially broken away and in cross section, of the system of FIG. 3.

For purposes of simplicity, FIG. 4 shows the louver 20 as a single, solid member. However, it is to be understood that each louver 20 is preferably segmented to allow free motion for each louver 20.

The louver design can be produced completely separate from the detector 16 such that any commercial gamma ray detector 16 can be inserted into the louvered collimator array.

The louvers 20 act as collimators for gamma and X-rays. Changing their direction gives effective screening of the gamma rays 44 except for those gamma rays 44 whose direction of propagation are aligned with the louvers 20.

The louvers 20 are raised and lowered to collimate the gamma rays 44, X-rays, or other ionizing radiation from specific locations. The angle of the collimators or louvers 20 gives the emission direction. The heavy metal plug 42 can be inserted or removed for radiation measurements directly below the device 10.

Figure 5:
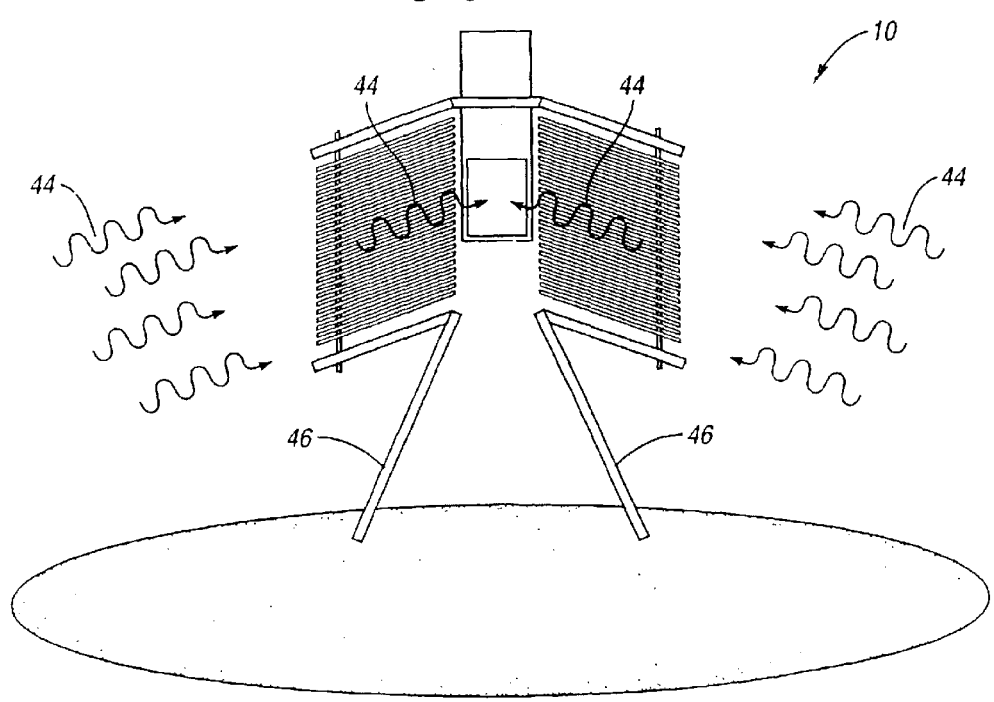
FIG. 5 is a simplified environmental view of the system of FIG. 2 including a support to make the system free-standing for ground survey or environmental work.

As shown in FIG. 5, the device 10 can be made freestanding for ground survey work by the inclusion of support legs 46. The louvers 20 can be operated remotely by remote control. Examples of remote operating include remotely operated stepping motors, radio controlled motors, and infrared controlled motors (not shown).

Figure 3:
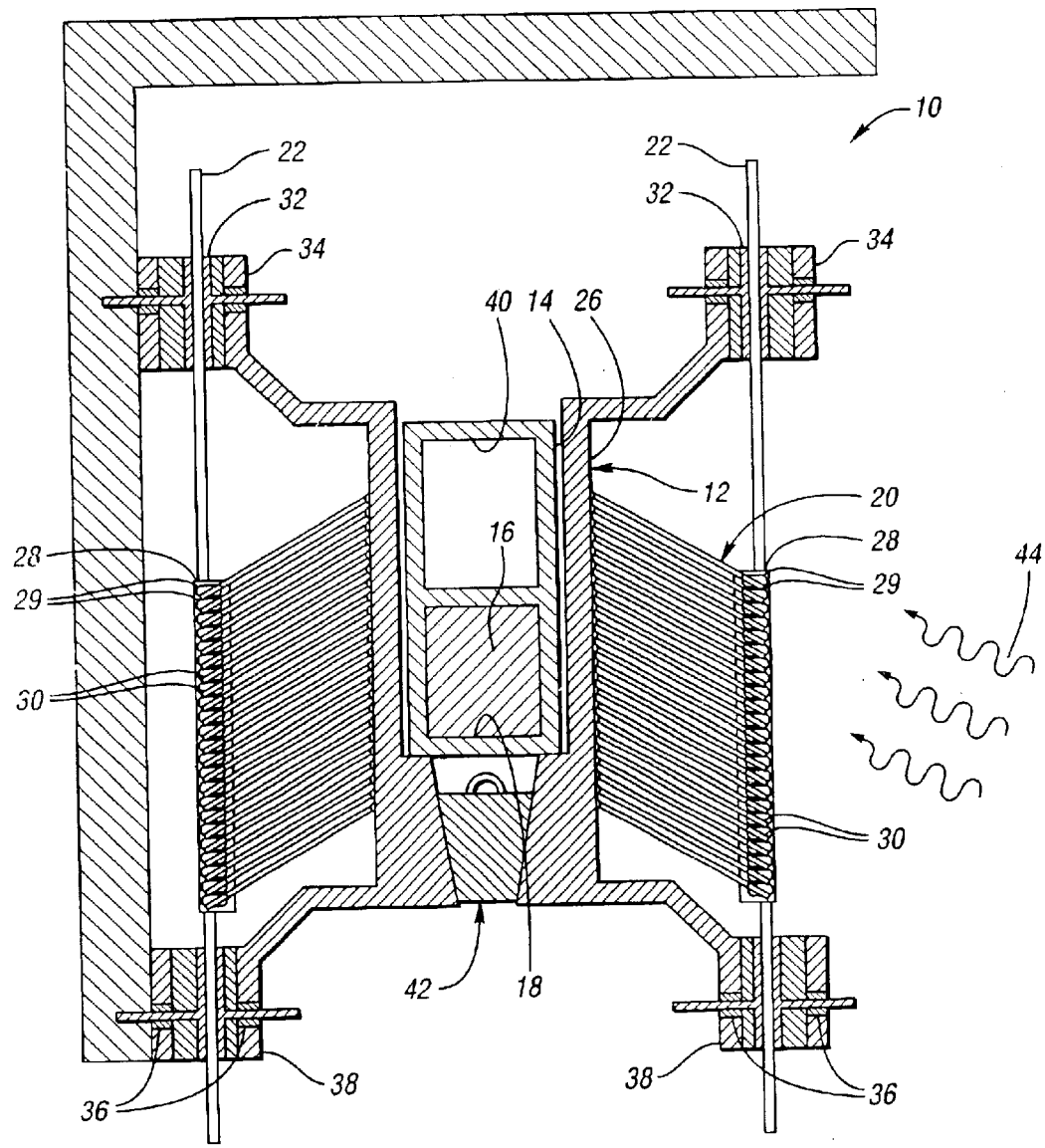
FIG. 3 is a view similar to the view of FIG. 2 wherein a second embodiment of the system includes a rotatable drum or box having a slot to enable the system to determine the direction from which the radiation came.

As shown in FIGS. 3 and 4, the device 10 can be fitted into a rotating attenuation box or drum, generally indicated at 50, in which a slot 52 is fashioned to give the direction from whence the radiation came. Hence, the device 10 can yield information on the direction and the angle from which the radiation came. After a single measurement, the drum 50 and its slot 52 can be rotated to a new view to measure the radiation from a new direction. The louvers 20 are moved at each slot setting to determine the radiation strength as a function of angle.

The louvers 20 and the rotating slotted box 50 may be made of many various materials, including lead, plastic, and tungsten. Plastics and high-density polyethylene work well to shield neutrons, whereas heavy materials work well to shield gamma rays. The louvers 20 and the slotted box 50 may be made from a series or layers of different materials.

FIG. 6 shows how the device 10 and the drum 50 can be made freestanding for ground survey work by the inclusion of support legs 54.

Computer algorithms can be used to determine the depth profile of the radiation after a survey is completed, as described in the above-noted parent patent application. Hence, the device 10 offers a viable tool to take radiation measurements of ground contamination from which the data can be used to determine the depth and profile of radiation contamination.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the invention will work for non-parallel planes, if multiple detectors or detectors capable of obtaining positional information are employed. An addition correction for unfolding or other method for dealing with the different responses could be employed in such a case.

The invention will work for detectors which are not semiconductors. One could use scintillators and gases of different types should their properties be appropriate.

Finally, a coded aperture appropriate to the given problem might be implemented.

What is claimed is:

1. A method for detecting ionizing radiation emitted by a material located over an extended area without the need for moving a radiation detector having a detection axis substantially perpendicular to the area and located within a detector space, the method comprising:

allowing ionizing radiation over a first narrow range of polar angles relative to the detection axis to enter the detector space and be detected by the detector while shielding ionizing radiation outside the first narrow range of polar angles from entering the detector space; and allowing ionizing radiation over at least one other narrow range of polar angles different from the first narrow range of polar angles to enter the detector space and be detected by the detector while shielding ionizing radiation outside the at least one other narrow range of polar angles from entering the detector space until the ionizing radiation emitted by the material over the extended area has been detected.

2. The method as claimed in claim 1, further comprising shielding ionizing radiation outside a first range of acute angles substantially perpendicular to the detector axis during the steps of allowing.

3. The method as claimed in claim 2 further comprising shielding ionizing radiation outside at least one other range of acute angles different from the first range of acute angles during the steps of allowing.

4. The method as claimed in claim 1, wherein each of the steps of allowing allows spaced, parallel planes of ionizing radiation to enter the detector space and be detected by the detector.

5. The method as claimed in claim 1, wherein the ionizing radiation is gamma rays.

6. The method as claimed in claim 1, wherein the detector is a radiation spectrometer.

7. The method as claimed in claim 1, wherein the ionizing radiation includes gamma rays and wherein the detector is a gamma ray spectrometer.

8. The method as claimed in claim 1, wherein the detector includes a semiconductor substrate.

9. A system for detecting ionizing radiation emitted by material located over an extended area, the system comprising:
- a support structure having a detector space;
- a detector having a detection axis substantially perpendicular to the extended area and disposed within the detector space; and
- an assembly located about the detector and including an array of spaced, parallel, collimating louvers movable together between different polar angles relative to the detection axis to allow ionizing radiation over narrow ranges of polar angles relative to the detection axis to enter the detector space and to be detected by the detector while shielding ionizing radiation outside the narrow ranges of polar angles from entering the detector space until ionizing radiation emitted by the material over the extended area has been detected.

10. The system as claimed in claim 9 wherein the assembly includes a movable mechanism for moving the louvers in unison at first ends of the louvers.

11. The system as claimed in claim 10 wherein second ends of the louvers are pivotably connected to the support structure.

12. The system as claimed in claim 10 wherein the mechanism is movable in a direction substantially parallel to the detection axis to move the louvers between the different polar angles.

13. The system as claimed in claim 9 further comprising a partial shield positioned about the detector for movement about the detection axis for shielding ionizing radiation outside selected ranges of acute angles substantially perpendicular to the detection axis.

14. The system as claimed in claim 13 wherein the partial shield is also positioned about the assembly.

15. The system as claimed in claim 9 wherein the array of collimating louvers are cylindrically symmetrical.

16. The system as claimed in claim 9 wherein the detector is a radiation spectrometer.

17. The system as claimed in claim 9 wherein the ionizing radiation includes gamma rays and wherein the detector is a gamma ray spectrometer.

18. The system as claimed in claim 9 wherein the detector includes a semiconductor substrate.

* * * * *